United States Patent
Winfield et al.

[11] Patent Number: 5,900,585
[45] Date of Patent: * May 4, 1999

[54] ELECTRICAL INTERCONNECTIONS

[75] Inventors: Phillip Roland Winfield; David Ions, both of Swindon, United Kingdom; James Patrick Reed, Redwood City, Calif.; Christian Kiermaier, Ottobrunn, Germany; Brian Clark, Brisbane, Calif.

[73] Assignee: Raychem Limited, Swindon, United Kingdom

[*] Notice: This patent is subject to a terminal disclaimer.

[21] Appl. No.: 08/765,992

[22] PCT Filed: Jul. 10, 1995

[86] PCT No.: PCT/GB95/01623

§ 371 Date: Jul. 14, 1997

§ 102(e) Date: Jul. 14, 1997

[87] PCT Pub. No.: WO96/02079

PCT Pub. Date: Jan. 25, 1996

[30] Foreign Application Priority Data

Jul. 11, 1994 [GB] United Kingdom .................. 9414039

[51] Int. Cl.[6] .................................................. H02G 15/08
[52] U.S. Cl. ........................ 174/74 R; 174/75 R; 174/76
[58] Field of Search ............................... 174/73.1, 74 R, 174/75 R, 76, 77 R, 84 R, 88 C

[56] References Cited

U.S. PATENT DOCUMENTS

| | | | |
|---|---|---|---|
| 3,571,783 | 3/1971 | Lusk | 339/117 |
| 3,876,820 | 4/1975 | Mashikian | 174/19 |
| 4,079,189 | 3/1978 | Troccoli | 174/73.1 |
| 4,377,547 | 3/1983 | Hervig | 264/262 |
| 4,852,646 | 8/1989 | Dittmer et al. | 165/185 |
| 4,863,535 | 9/1989 | More | 156/49 |
| 4,868,967 | 9/1989 | Holt et al. | 29/450 |
| 5,079,300 | 1/1992 | Dubrow et al. | 525/106 |
| 5,606,149 | 2/1997 | Yaworski et al. | 174/92 |
| 5,804,767 | 9/1998 | Windfield et al. | 174/74 R |

FOREIGN PATENT DOCUMENTS

| | | | |
|---|---|---|---|
| 0 321 263 A2 | 6/1989 | European Pat. Off. | H02G 15/10 |
| 2 394 197 | 1/1979 | France | H02G 15/18 |
| 2558017 | 7/1985 | France . | |
| 6-54426 | 2/1994 | Japan . | |
| 2269712 | 2/1994 | United Kingdom . | |
| WO 86/02210 | 4/1986 | WIPO . | |
| WO 88/00603 | 1/1988 | WIPO | C08L 53/02 |
| WO 95/11543 | 4/1995 | WIPO | H02G 15/184 |

OTHER PUBLICATIONS

Derwent Abstract No. 78–L0695A/51 (Abstract of FR 2,394,197) (Jan. 1979), Abs only.

*Primary Examiner*—Kristine Kincaid
*Assistant Examiner*—Chau N. Nguyen
*Attorney, Agent, or Firm*—Herbert G. Burkard; Yuan Chao

[57] ABSTRACT

A 15 kv cable joint is enclosed within two half shells filled with sealant material. Displacement or thermal expansion of the sealant is accommodated by various configurations of stress cones that have apertures or surfaces that are flexible and arranged to maintain pressure on the sealant for example during thermal cycling of the joint.

19 Claims, 15 Drawing Sheets

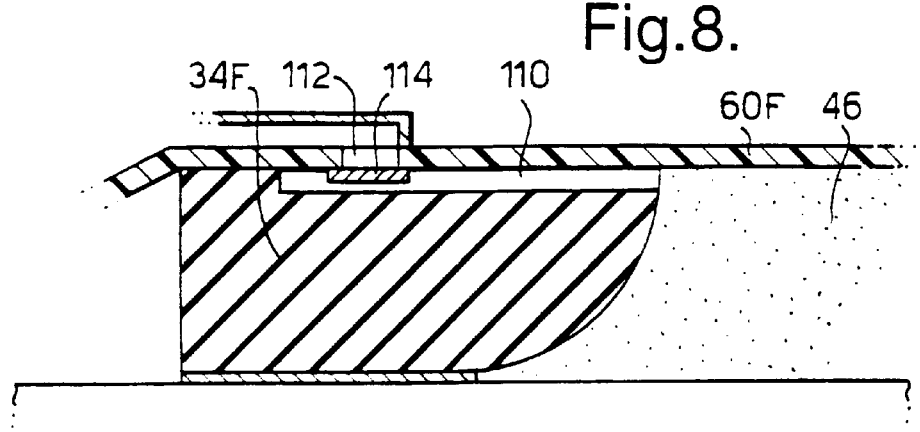
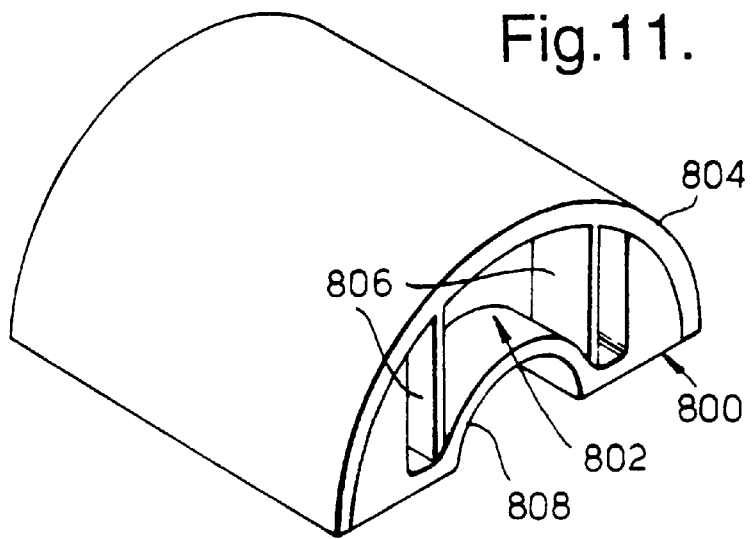
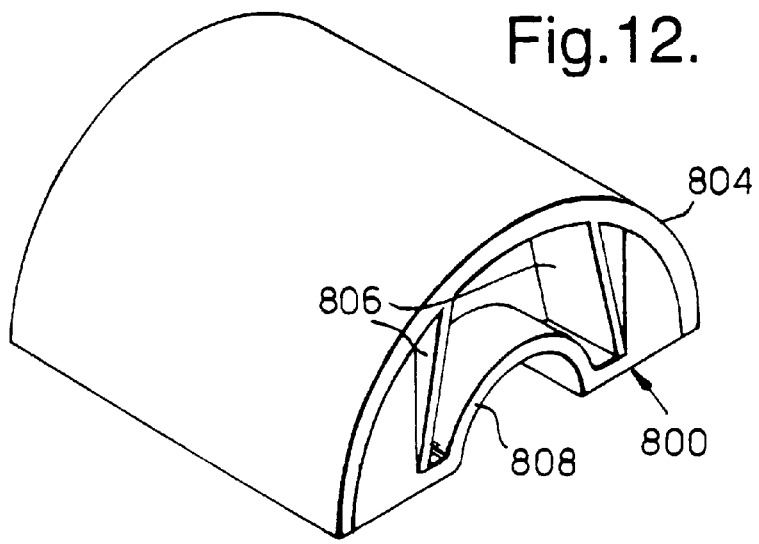

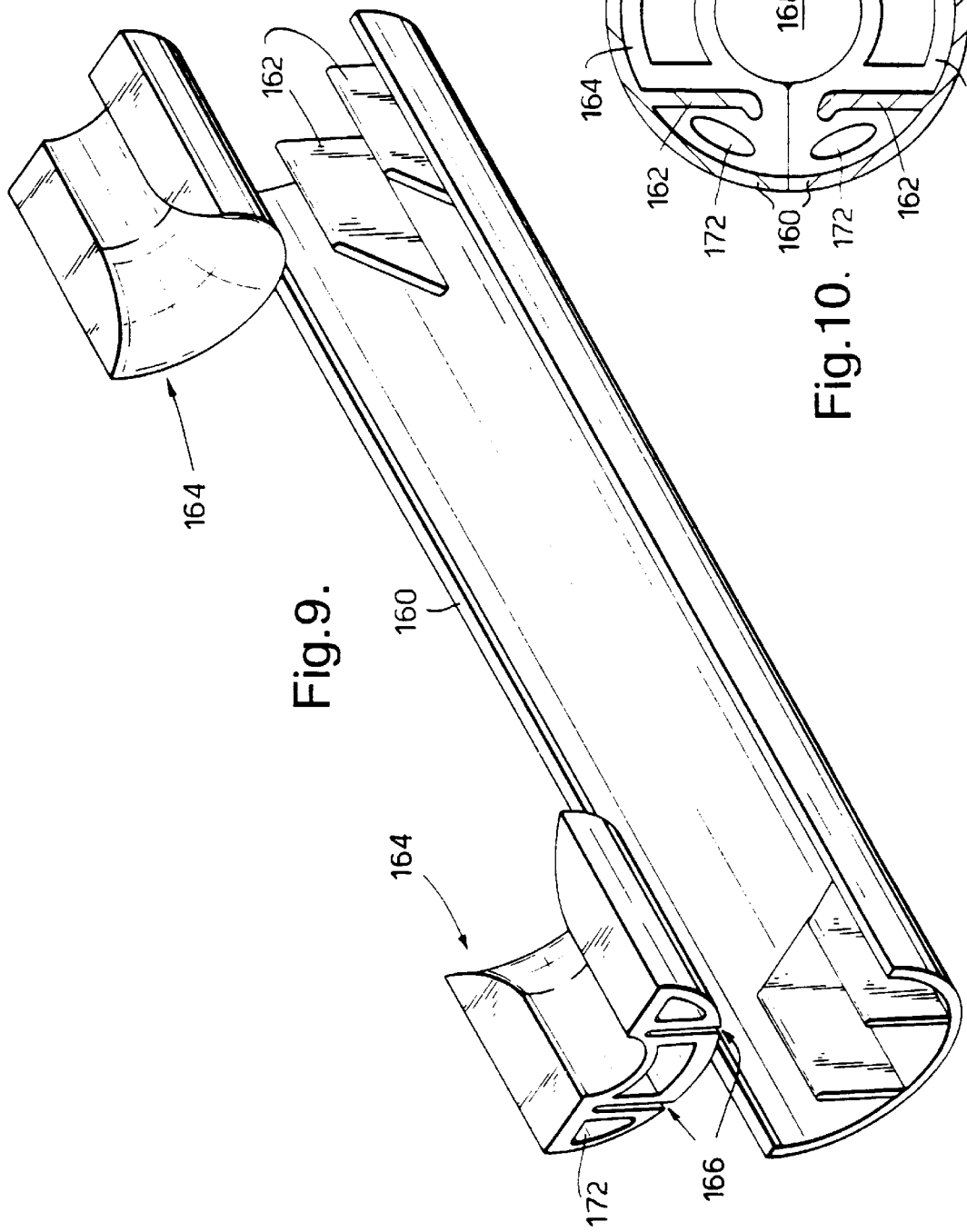
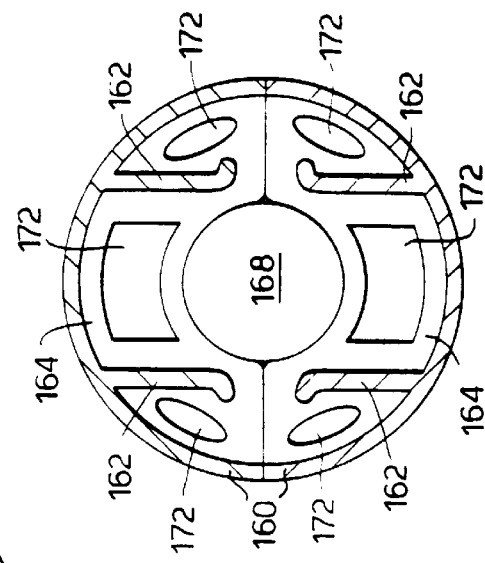
Fig. 9.
Fig. 10.

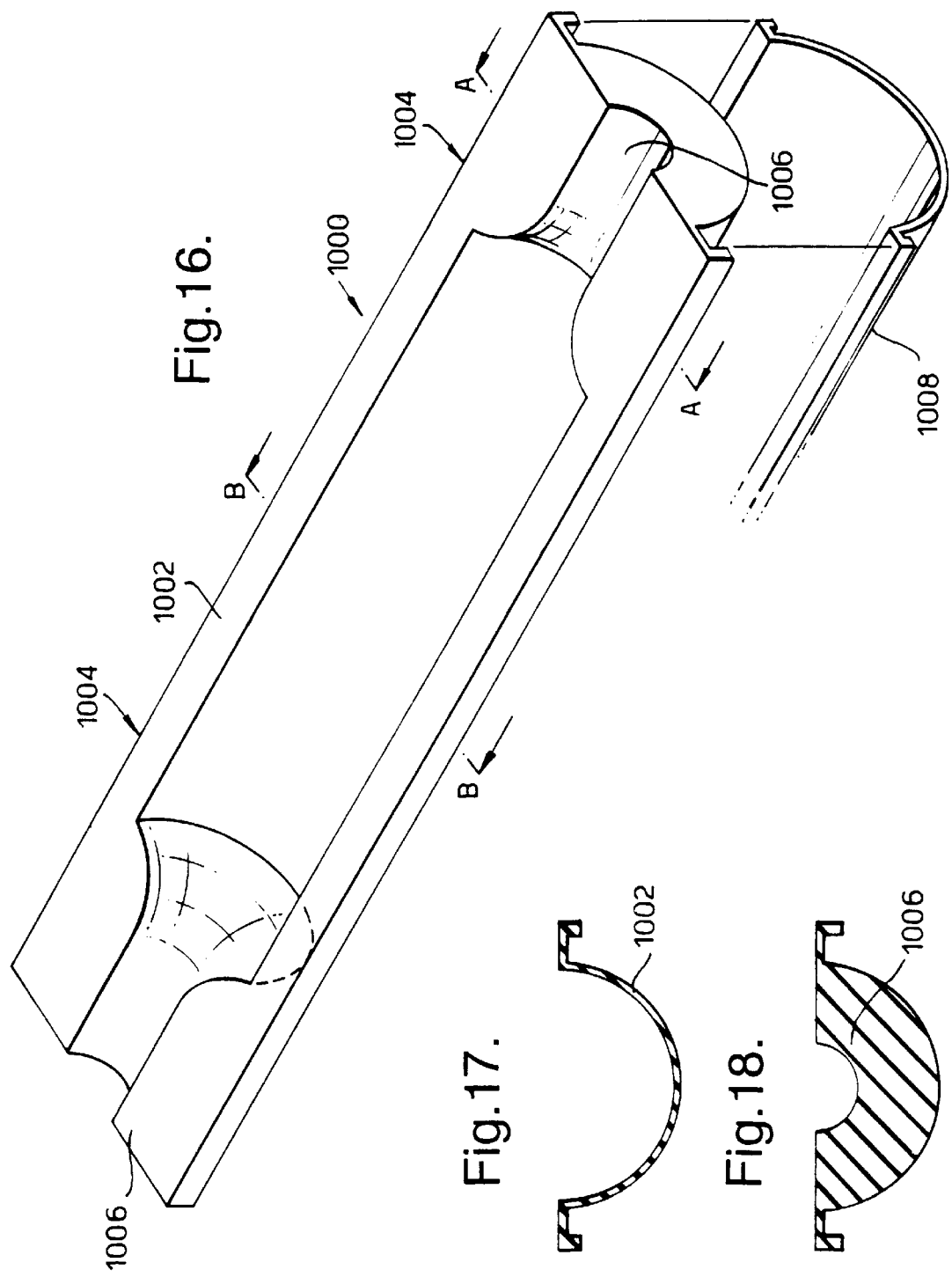

ELECTRICAL INTERCONNECTIONS

FIELD OF THE INVENTION

This invention relates to the protection of electrical interconnections. Such interconnections may be between two or more electrical cables (i.e. in-line or branch joints), between two or more pieces of other electrical equipment such as transformers and switchgear, but which may also include another cable or between cable and equipment, including cable adapters and terminations. Such an interconnection usually needs to be protected against ingress of moisture to interconnected conductors, and to provide electrical insulation therearound. Additionally, at voltages above about 10 kV, some form of electrical stress control is usually also desired. The invention is generally applicable to electrical interconnections at low voltage, typically around 1 to 10 kV, at medium voltage, typically around 10 to 36 kV, and also at high voltage, typically greater than 36 kV.

DESCRIPTION OF RELATED ART

Various technologies exist for protecting such interconnections, some of which are more applicable to one voltage range rather than another, and some applicable to cables, for example, of one material, for example polymeric, then another, for example paper. Amongst these technologies may be mentioned polymeric heat shrink, elastomeric push -on and roll-on, elastomeric hold-out, tape winding, hot bitumen filling, and cold-pour resin systems. Yaworski et al., U.S. Pat. No. 5,606,149 (1997), the contents of which also published in International Application Publication No. WO 95/11543, discloses a power cable joint which is filled by a compressible sealant material such as gel, which has been found to have surprisingly good performance.

BRIEF SUMMARY OF THE INVENTION

The present invention is particularly concerned with an interconnection between an electric cable and other electrical equipment in which a compressible, and preferably oil-extended polymeric, sealant material is employed to seal and to provide electrical insulation around the connection.

Thus, in accordance with one aspect of the present invention, there is provided an enclosure arranged to enclose a connection between a screened electric power cable and another piece of electrical equipment, the enclosure comprising a housing, at least one electrical stress cone contained within the housing, and a quantity of compressible sealant material that is contained by the housing and that substantially fills the housing when enclosing the interconnection, wherein the or each stress cone comprises resilient aperture means that is arranged to change its volume in response to a change of volume of the sealant material thereby, in operation, to maintain substantially complete filling of the housing around the interconnection without the formation of voids therein.

The resilient aperture can thus adapt to the volume of the sealant material as it changes in response to change in temperature of the substrate or of its ambient surroundings or to other external pressure. The sealant material advantageously adheres to the resilient means so as to minimise the likelihood of a void forming as a result of movement of the material.

The aperture means may expand, or stretch, as the sealant expands, or it may be arranged to be in a relaxed configuration when the sealant is in its expanded state, which is expected to be the state it occupies most of its time in operation.

In many applications of the present invention, it is advantageous for the resilient aperture means to exert a continuous pressure on the sealant material. However, when the sealant material comprises a combination of solid and a liquid component, such as a gel comprising an oil-filled polymer for example, the pressure should not be such as to urge the liquid component significantly out of the complete system.

The aperture means may be provided by a void or gaseous entrapment contained completely within a resilient portion of the stress cone, or located between a resilient portion of the cone and a non-resilient portion of the housing.

A spring and plunger arrangement may be provided so as to prevent the formation of voids in the interconnection. Alternatively, a resilient wall may be arranged as a diaphragm to exert, or to maintain, pressure on the sealant material.

The sealing is typically required to provide a block to the passage of air, moisture, or other fluids.

The sealing material of the invention may generally comprise any compressible sealing material, e.g. mastic or grease (especially a highly viscous grease such as a silicone grease). Preferably, however, the sealing material comprises cured gel.

The gel may, for example, comprise silicone gel, urea gel, SEBS, SBS, di- and tri-block copolymers and blends thereof, urethane gel, or any suitable gel or gelloid sealing material. Preferred gels comprise oil-extended polymer compositions. Preferably the gel has a hardness at room temperature as determined using a Stevens-Voland Texture Analyser of greater than 48 g, particularly greater than 14 g especially greater than 18 g, e.g. between 18 g and 29 g. The test settings of the Analyser should be: speed=0.2 mm/sec; penetration=4 mm; and sphere diameter=0.25 inch. It preferably has a stress-relaxation less than 60%, particularly less than 50% and especially less than 40% and preferably greater than 10%. Ultimate elongation, also at room temperature, is preferably greater than 100%, especially greater than 200%, particularly greater than 400%, as determined according to ASTM D638. Tensile modulus at 100% strain is preferably at least 1.8 MPa more preferably at least 2.2 MPa. In general compression set will be less than 25%, especially less than 15%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm). Reference is also made to U.S. Pat. No. 4,852,646, especially FIG. 3 thereof, for alternative gel parameters., showing the relationship between the Voland Hardness and the Cone Penetration value, the entire contents of which are included herein by this reference. Also, reference is made to the suitable materials disclosed in U.S. Pat. No. 5,079,300, the entire contents of which are included herein by this reference.

Alternatively, the polymer composition of the gel may for example comprise an elastomer, or a block copolymer having relatively hard blocks and relatively soft elastomeric blocks. Examples of such copolymers include styrene-diene block copolymers, for example styrene-butadiene or styrene-isoprene diblock or triblock copolymers, or styrene-ethylene-butylene-styrene triblock copolymers as disclosed in international patent publication number WO88/00603. Preferably, however, the polymer composition comprises one or more styrene-ethylene-propylene-styrene block copolymers, for example as sold under the Trade Mark 'Septon' by Kuraray of Japan. Septon 2006 is a particularly preferred grade. The extender liquids employed in the gel preferably comprise oils conventionally used to extend elastomeric materials. The oils may be hydrocarbon oils, for example paraffimic or naphthenic oils, synthectic oils for example polybutene or polypropene oils, and mixtures thereof. The preferred oils are mixtures of non-aromatic paraffins and naphthenic hydrocarbon oils. The gel may contain known additives such as moisture scavengers (eg. Benzoyl chloride), antioxidants, pigments and fungicides.

The gel used in the present invention advantageously has a dielectric breakdown strength of at least 18 KV/mm, preferably greater than 24 KV/mm, being in the preferred range of 24 to 50 KV/mm, but could even be as high as 100 KV/mm. These values apply not only to the bulk values of the gel itself, but also to any interface between the gel and other materials with which it has contact in the interconnection. The preferred gel material comprises a silicone gel, being a silicone polymer extended with an inert silicone oil.

It will be understood from this document that the term "compressible" in the context of the sealant material refers to a material that, upon being subject to an external pressure, is compressible so as to flow around an enclosed substrate. The pressure may arise from the housing that contains the sealant material being applied to, for example closed around, the electrical interconnection, or from thermal expansion of the sealant material. With the preferred sealant material being a gel, the compressive force results in deformation and/or displacement that allows substantially complete conformity with the substrate, which conformity can be maintained even under thermal cycling.

The connection will typically be of substantially cylindrical configuration. The present invention is of particular applicability in connections in which the housing consists of two, or more, inter-engaging components, for example two half-shells. In such a configuration, the stress cone is also advantageously formed of a plurality of components, for example two halfcones that mate on closure of the housing, so that the interconnection can conveniently be formed in a wraparound manner around the already-made electrical connection, for example a crimp. Conveniently, the gel sealant is supplied as a filling contained within each part of the housing, which then seals the interface therebetween. The advantages of this configuration, especially when using a gel as the sealant, are discussed in Yaworski et al., U.S. Pat. No. 5,606,149 (1997), the entire contents of which are included herein by this reference. In particular, the surprisingly high dielectric strength found at the interface of the two portions of the gel, and the excellent adhesion of the gel to the components of the interconnection, such as the cable materials (usually polyethylene or polyvinylidene chloride), substantially prevent air pockets to exist therebetween and allow a cable joint, for example, to be made of a much-reduced length than has previously been possible. A shorter length joint requires less cable preparation, and thus less time to complete, this being particularly so when the cable system is buried in the ground.

The housing used in the invention, preferably formed from two inter-engaging half shells, is preferably made of a conductive polymeric material, having a volume resistivity of the order 103 ohm-cm. Advantageously its material is carbon-filled polypropylene. Alternatively, the housing may have an insulating inner component and a conductive outer component, to provide the required screening function. As other options for the housing, there may be mentioned a push-on arrangement that is stretched over the interconnection, or a revolving sleeve as disclosed in U.S. Pat. No. 4,868,967. The housing that seals the electrical interconnection advantageously has at least a portion of a wall thereof that is subject to the pressure of the sealant material formed so as to flex in order to accommodate change of volume of the sealant material. The resilient wall section may be bounded externally by a non-resilient wall portion so as to define a displacement cavity therebetween, which cavity may contain resilient means. It is also envisaged that a major part of the housing surface (ie>50%), and advantageously substantially the whole of that part of the surface that peripherally encloses the sealant material, is resilient. The housing may be deformable such that it is able to change from a cross-section of one shape to a cross-section of a different shape that encloses a larger volume. For example, the housing may be arranged to change from a generally oval to a substantially circular cross-section.

In order to contain the sealant material, particularly though not exclusively when it is a material such as an oil-extended polymer, when it is subject to a compressive force on closing therearound of a housing, formed from two half-shells for example, it is preferred that the closing edges of the housing overlap before final closure takes place, and thus before significant displacement pressure is exerted on the sealant material. In the case of two longitudinally-extending half-shells, for example, a projection along the longitudinal edge of one half may engage a channel along the other edge. The sealant material is thus circumferentially contained within the closing housing before sufficient pressure is exerted on the sealant material to exude it laterally out of the housing.

Means may be provided to restrain movement of the housing rotationally and/or longitudinally with respect to its substrate, which may be an electrical interconnection for example.

A flexible part of the closed housing, or of another component within the joint that is subject to, and contains the pressure of, the sealant material, may be arranged such that the flexible portion follows any contraction of the sealant material so as to avoid the formation of any pockets of air.

The Faraday Cage member is preferably of a conductive thermoplastic material of similar resistivity to that of the conductive housing, but it may alternatively be formed of metal or metallised plastics material. The conductive Faraday Cage member is advantageously resilient so as to exert pressure on the sealant material, thereby substantially to prevent the formation of voids within the housing outside the conductive member contained therein. Preferably, the conductive member has at least one void or gaseous entrapment completely contained therewithin that is subject to the pressure of the sealant material. The support cradle for the Faraday Cage is preferably formed of an insulating thermoplastics material. The support member can conveniently be secured to the housing so as positively to locate the conductive Faraday Cage member within the flowable sealant material.

The stress cone used in the invention may be made of a conductive rubber or elastomeric material, EPDM for example, typically of volume resistivity $10^3$ ohm-cm.

The enclosure may comprise a sealing member, acting as a stress-relief cone for example, and the sealing member advantageously comprises (a) a relatively rigid component and (b) a relatively resilient component, which may have at least one aperture therein. The relatively rigid component is arranged to urge the relatively resilient component into substantially complete conformity around the substrate, and the sealing member is thus able to accommodate a range of substrates, electric power cables for example, of different sizes, usually diameters, whilst maintaining a good, substantially void-free seal therearound.

It is to be understood that the materials of each of the components used in the invention are to be selected so as to be compatible with any component with which they come into contact and so as not to have any adverse reaction therewith, especially over longer time periods.

In accordance with another aspect of the present invention, there is provided an interconnection between a electric cable and another piece of electrical equipment, the interconnection being enclosed within an enclosure in accordance with the first aspect of the invention.

The other piece of electrical equipment may be, for example, another electrical cable, or equipment such as switchgear or a transformer to which the said cable is connected, or other equipment at which the said cable is terminated.

Enclosures and interconnections in accordance with the present invention are hereinafter described especially with reference to FIGS. 1 to 6 and FIG. 8 of the accompanying drawings but it is envisaged that features of other Figures may also be included in such enclosures or interconnections, for example, the features associated with the Faraday Cage (FIGS. 1 and 13), the housing (FIGS. 1, 6, 14 to 20 and 23 to 25). Furthermore, the present invention may also encompass the Faraday Cage support features (exemplified in FIGS. 21 and 22), and may employ a range-taking sealing member (as exemplified in FIGS. 1, 7 and 9 to 12). Some of these features are the subject of U.S. Pat. No. 5,804,767 (1998); U.S. application Ser. No. 08/765,991, filed Apr. 21, 1997, and U.S. application Ser. No. 08/765,673, filed May 8, 1997, the entire disclosures of which are incorporated herein by this reference.

BRIEF DESCRIPTION OF THE DRAWINGS

Embodiments of the present invention will now be described, by way of example, with reference to the accompanying drawings, in which:

FIG. 8 shows a further modification of a stress cone for accommodating sealant expansion within the joint of FIG. 1;

FIG. 9 shows a dis-assembled view of one half of a modified arrangement of outer housing and stress-relief cones for use in the general joint construction of FIG. 1;

FIG. 10 shows a cross-section through a completed joint employing a stress cone as shown in FIG. 9;

FIGS. 11 and 12 are isometric views of the rear end of one half of a modified range-taking stress cone;

FIG. 16 shows an isometric view of one half of a further modification, in which an integral insert provides for gel expansion and includes stress cones;

FIGS. 17 and 18 show sections along lines B—B and A—A respective of FIG. 16;

DETAILED DESCRIPTION OF THE INVENTION

Figure 1:
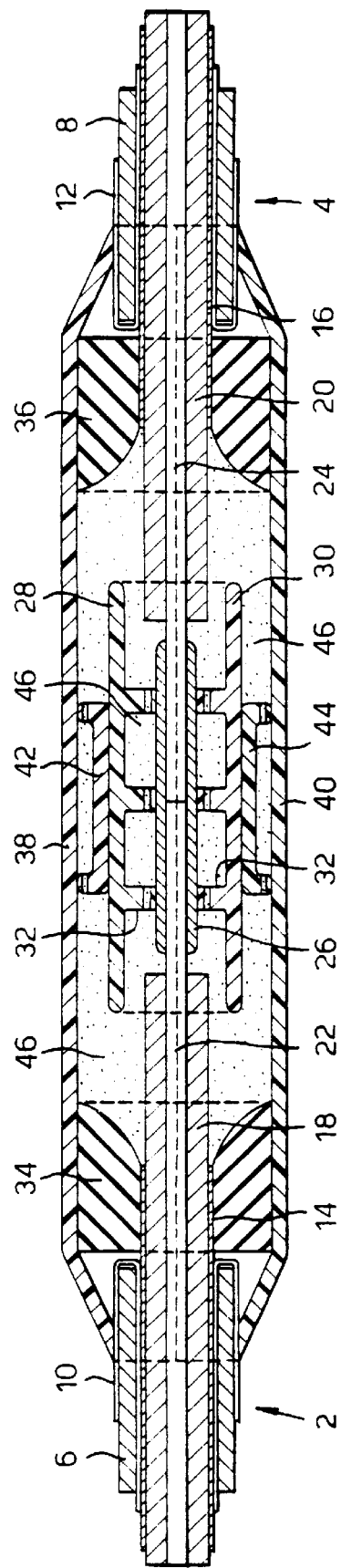
FIG. 1 shows schematically a cross-sectional elevation of an in-line joint between two screened 15 kV power cable joints, for demonstrating the general principles of the invention.

Referring to FIG. 1, the in-line joint is formed between two substantially identical polymeric cables 2, 4. The respective outer jackets 6, 8, screen wires 10, 12 screen layers (semi conducting or conducting) 14, 16, primary dielectric layers 18, 20, and conductors 22, 24, are successively cut back in standard manner, with the screen wires 10, 12 being folded back over their respective jackets 6, 8 for subsequent interconnection (not shown) across the joint so as to maintain earth continuity. The conductors 22, 24 are electrically interconnected by means of a crimp connector 26, although any other suitable type of connector may be used. Electrical stress control of the conductor connection thus made is provided by a member comprising two generally semi-cylindrical half shells 28, 30 made of conductive polymeric material that are brought together around the crimp connector 26 between the two cables and which longitudinally extends a short way over the cable dielectric layers 18, 20. Each half shell 28, 30 has three inwardly-directed projections 32 that make electrical contact with the crimp connector 26 to ensure that the half shells 28, 30, and the conductive components enclosed therewithin are maintained at the same electrical potential, namely the potential of the cable conductors. The half shells 28, 30 thus provide a Faraday Cage effect around the crimp connector 26 and exposed conductors 22, 24. It should be noted that the half shells 28, 30 do not seal on to the cable dielectrics 18, 20.

Stress-relief cones 34, 36 are provided for the respective cables 2, 4 and are located so as to provide a conical surface directed away from the cut back ends of respective shields 14, 16 in the usual manner. The stress cones 34, 36 are formed of a conductive rubber and are each provided as a pair of half cones for assembling around the cables 2,4 after the electrical connection therebetween has been made.

The stress cones 34, 36 and Faraday Cage 28, 30, are completely enclosed within a pair of generally semi-cylindrical outer hinged half shells 38, 40 made of conductive polymeric material, namely carbon-filled polypropylene, that fit together to form a cylindrical housing that clamps around the cables 2, 4 so as to seal down on to respective cable jackets 6, 8 to each side of the joint.

An electrically insulating support cradle, formed as two semi-cylindrical components 42, 44, is secured to the outer surface of the Faraday Cage 28, 30 and to the inner surface of the outer housing 38, 40, so as positively to locate the Faraday Cage 28, 30 both longitudinally and radially within the joint and thereby to ensure electrical isolation of the Faraday Cage from the outer housing.

The space remaining within the housing 38, 40 around and within cradle 42, 44 and the Faraday Cage 28, 30, and longitudinally bounded by the stress cones 34, 36, is completely filled with an electrically-insulating silicone gel 46.

The components of the joint are assembled by locating respective ones of the support cradle 42, 44, the Faraday Cage 28, 30 and the stress cones 34, 36 within respective housing half-shells 38, 40, pouring the gel 46 in liquid, un-cured form into each half shell up to its rim, and then allowing the gel to cure. The cables 2, 4 are then prepared by being cut back, the conductors 22, 24 secured together by the crimp connector 26, and insulating, stress relief and screening are then provided simply by clamping the prepared housing half shells 38, 40 therearound. The securing together of the half-shells 38, 40 brings together the generally planar surfaces of each portion of the gel 46, which then provides a high dielectric strength interface, not only gel-to-gel where the half shells meet, but also on to the enclosed components of the cables 2, 4, such as the dielectrics 18,20.

As the two half shells 38, 40 are closed around the jointed cables 2, 4, the gel 46 is subjected to a compressive force such that it flows around all of the components and conforms therewith. Air present around the jointed cables is thus forced away and its place taken by the deformed gel 46. It will be appreciated that before closure the gel 46 substantially fills the half-shells 38,40 to their rims. Accordingly, upon closure around the jointed cables, a quantity of the gel 46 is displaced, and this has to be accommodated by the construction of the joint. Furthermore, thermally cycling of the power cables 2, 4 gives rise to expansion of the gel, which also has to be accommodated. Embodiments of the joint disclosed hereinafter solve these problems.

Further details and features of the general construction and assembly of such a joint are given in Yaworski et al., U.S. Pat. No. 5,606,149 (1997), the entire contents of which are included herein by virtue of this reference.

The following FIGS. 2 to 25 show in further detail specific features of the cable joint of FIG. 1, and variations thereof, each in accordance with various aspects of the present invention. It is to be understood that all combination of two or more features herein described are considered as embodiments of the present invention, except where such a combination is obviously non-operable.

Figure 2:
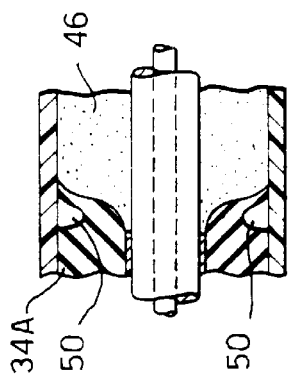
FIGS. 2, 2A show schematically a first embodiment of the invention in which a stress-relief cone of the joint of FIG. 1 is arranged to accommodate expansion of sealant material of the joint.
Figure 2A:
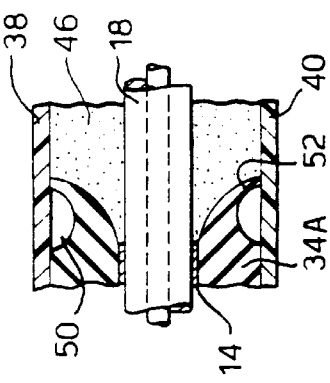

Referring to FIGS. 2 and 2A, a stress cone 34A, in two generally semi-cylindrical parts, is a modification of the basically configured stress cone 34 of FIG. 1. It is formed within the housing 40 so as to define an annular void 50 therewith. The cone 34A extends away from the edge of the screen 14 with a leading edge 52 of the cone 34A sealing on to the housing 40.

The gel 46 is seen to fill the volume within the housing 40 around the cable dielectric 18. FIG. 2 shows the arrangement of the cable joint on installation, with the cable unpowered and cold. In operation, the cable conductor can reach operating temperatures of up to 95 degrees Celsius, and in some instances even higher. Under these condition the gel in the joint, typically being a quantity between about 200 grams and about 300 grams, can extend up to 20% in volume. and with a rigid outer housing 40, the expansion has to be accommodated within the configuration of the joint. In the present embodiment, expansion of the gel 46, acting on the relatively soft rubber of the stress cone 34A is arranged to compress the void 50, as seen in FIG. 2A. As the gel 46 contracts on cooling, the resilience of the cone 34A, and in particular of its leading edge 52 acts on the gel so as to maintain its sealing pressure around the various components of the joint. Thus, the formation of voids around the joint components in the electrically highly-stressed areas between the two symmetrically disposed stress cones 34A and 36A (the latter not being shown) at each end of the joint is prevented, since sufficient pressure is maintained on the gel 46 under all conditions. It is to be noted that the deformation of the leading edge 52 of the stress cone 34A is arranged, by suitable positioning of the void 50, to take place at a radial distance outwardly of the cable 2 such that control of the electric field at the cut-back end of the screen 14 is not diminished, at least not to any significant extent.

Figure 3:
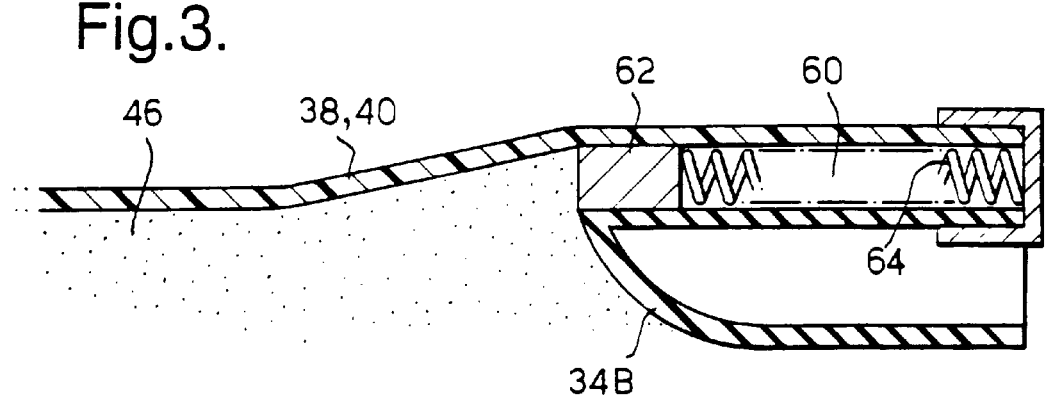
FIG. 3 shows another form of stress cone to that of FIG. 2.

FIG. 3 shows a further modified stress cone 34B located within the housing 40, in which an aperture 60 at a radially-outward extremity of the cone is closed to entry of the gel 46 by a plunger 62 that is biassed outwardly by a spring 64. Thus, as gel 46 expands, the pressure exerted on the plunger 62 forces it into the aperture 60 against the force of the spring 64, and on relaxation of the gel 46, the restoring force of the spring 64 maintains pressure on the gel 46 so as to prevent the formation of any undesirable voids in electrically-vulnerable areas of the joint.

Figure 4:
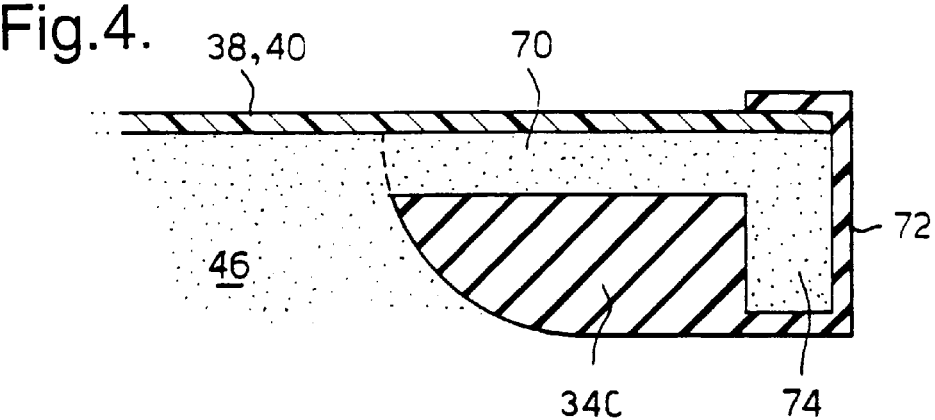
FIGS. 4, 4A show still another form of stress cone, in section and in isometric view respectively.
Figure 4A:
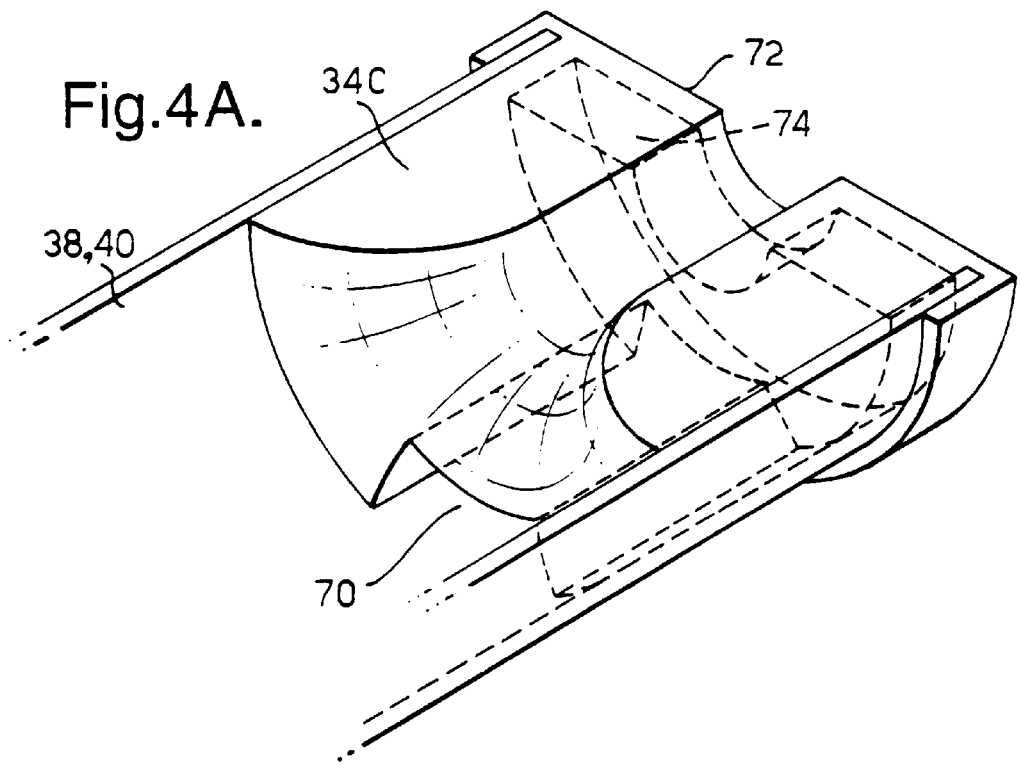

FIGS. 4 and 4A show another embodiment of a stress-relief cone arranged to accommodate expansion of the gel in a joint configured generally as shown in FIG. 1. The resilient cone 34C of these Figures is mounted within the outer housing 40 and has an aperture 70 adjacent to the inner wall thereof. The aperture 70 is open to receive gel 46 and to allow access of the gel to the interior of the cone bounded at its rear end, that is to say the end away from the crimp region of the joint, by a wall portion 72 acting as a diaphragm of an expansion chamber 74. In operation, therefore, increase in volume of the gel 46 exerts a pressure through the aperture 70 on to the diaphragm 72, which stretches accordingly, and which tends to return to its natural un-stretched state on relaxation of the gel.

Figure 5:
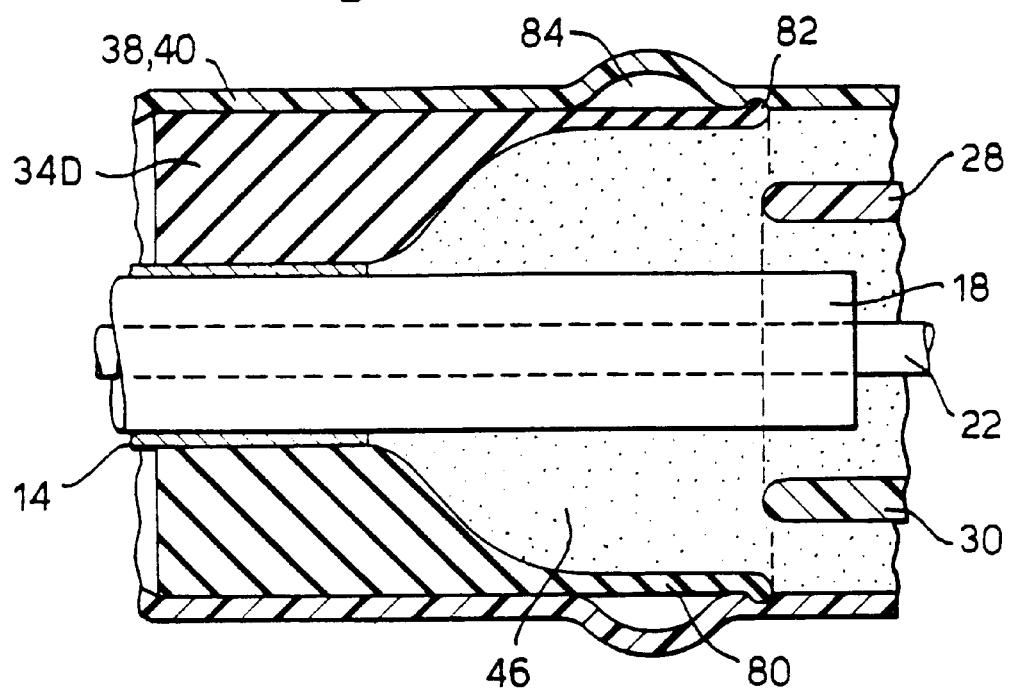
FIGS. 5, 5A show another variation of the cable joint of FIG. 1, in which sealant expansion is accommodated, in section and in isometric view respectively.
Figure 5A:
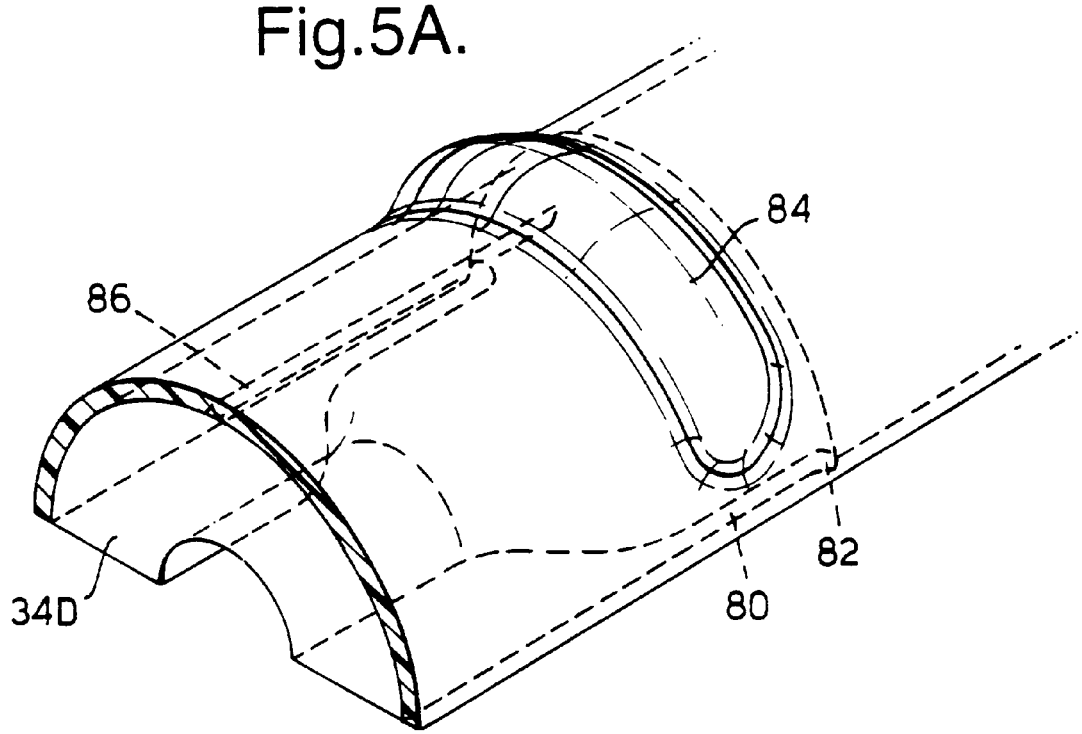

The modified joint configuration of FIGS. 5 and 5A shows a stress cone 34D provided with a cylindrical tubular extension 80 at its front end terminating in a lip 82 secured in the inner wall of the housing 40D. The housing 40D is domed partway around its circumference in the region of the cone extension 80 so as to form a cavity 84 with the extension 80 mounted as a flexible diaphragm thereacross. Increase in volume of the gel 46 within the joint thus urges the extension 80 locally to stretch into the cavity 84. Continuous pressure is thus maintained on the gel 46 as temperature variation leads to its increase or decrease in volume. As shown in FIG. 5A, the cavity 84 is vented by a channel 86 to a region behind the cone 34D so as to prevent build up of a vacuum. As can be seen from FIG. 5A, the expansion cavity 84 extends only partway around the circumference of each of the half shells 38D, 40D of the housing in order to allow for peripheral sealing of the half-shells of the joint by the gel contained therein. The portion 80, which as shown is an integral extension of the stress cone 34D but which may be a separate component, is bonded directly so the housing 38D, 40D along each longitudinal edge thereof where the two halfshells mate, in order to prevent air being trapped between the portion 80 and the housing.

In a modification of the concept of FIG. 5 and 5A, the housing 38, 40 is not domed to define a cavity such as 84, but continues as a straight cylinder over and in contact with the diaphragm portion 80. In this configuration, the extended portion 80, which may be a component separate from the stress cone 34, 36, is not bonded to the overlying housing except along the longitudinal edges as mentioned above. Thus, when the gel 46 contracts, the portion 80, under the action of air pressure through the vent 86, follows the movement of the gel towards the centre of the joint, moving away from the inner wall of the housing as it does so. It is envisaged that the component 80 may comprise a liner extending completely longitudinally of the joint, and in this embodiment, it will be also bonded so the housing 38, 40 in the region surrounding the Faraday Cage 28, 30 to maintain the electrical geometry of the joint in this region.

Figure 6:
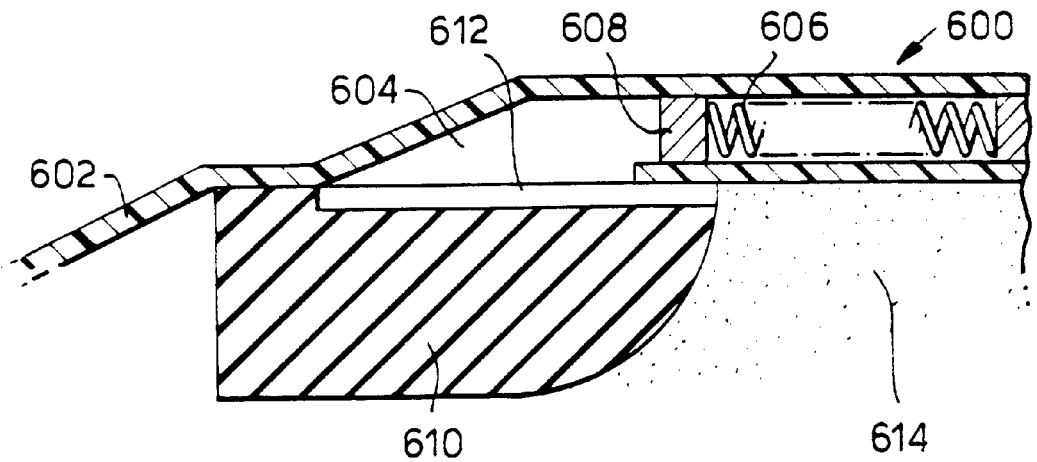
FIG. 6 shows a partial section through one half of a modified joint.

FIG. 6 shows part of one half of a joint 600 that combines concepts from the embodiments of FIGS. 3 and 4. The enclosing half-shell 602 of the joint 600 has a longitudinally extending channel 604 in its outer wall extending along substantially its whole length at one circumferential location. A spring 606 and plunger 608 are retained in each half (only one of which is shown) of the length of the channel 604. A substantially rigid half stress cone 610 is located within the half shell 602 and has a channel 612 in its outer surface that extends from the front end of the cone 610 facing the gel filling 614 of the joint to the rear of the cone 610 and that is in communication with the housing channel 604. Gel 614 can thus flow through the channel 612 between the cone 610 and the housing 602, enter the housing channel 604 and thus act on or be acted upon by the spring-biassed plunger 608, in order to accommodate displacement or expansion of the gel.

Figure 7:
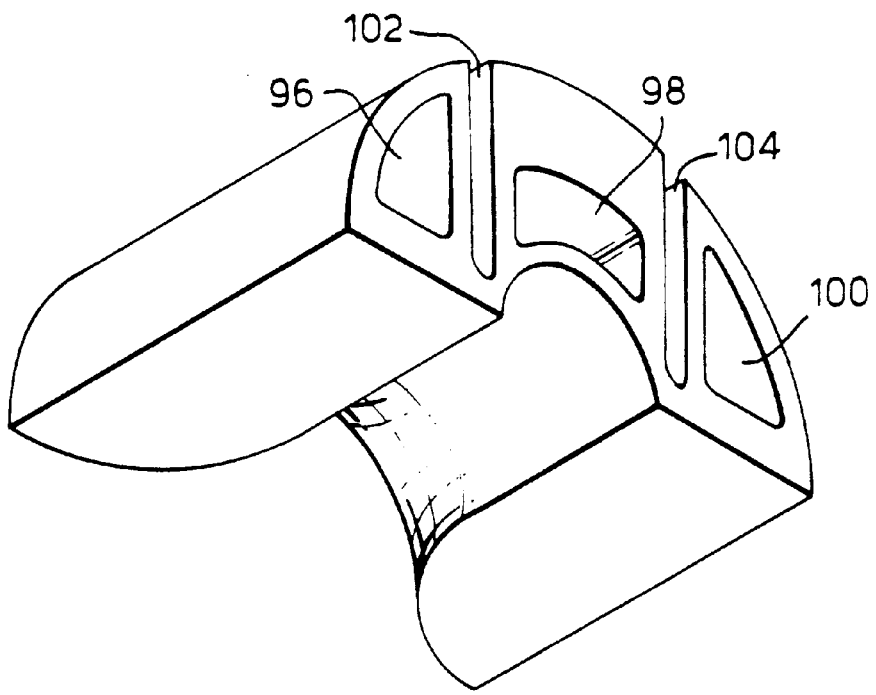
FIG. 7 shows another form of stress cone for use with the joint of FIG. 1.
Figure 7A:
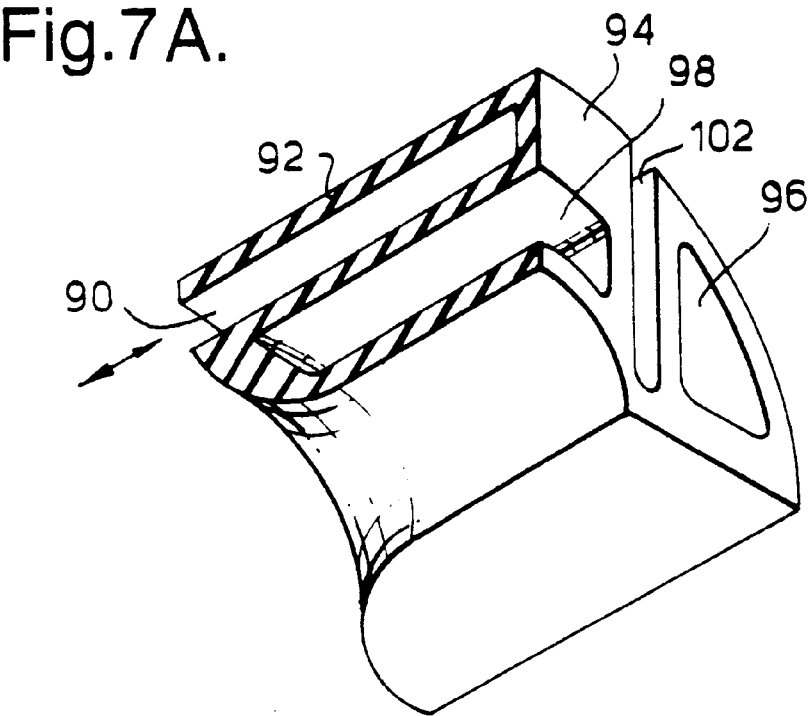
FIG. 7A shows a cutaway view of the stress cone of FIG. 7.
Figure 7B:
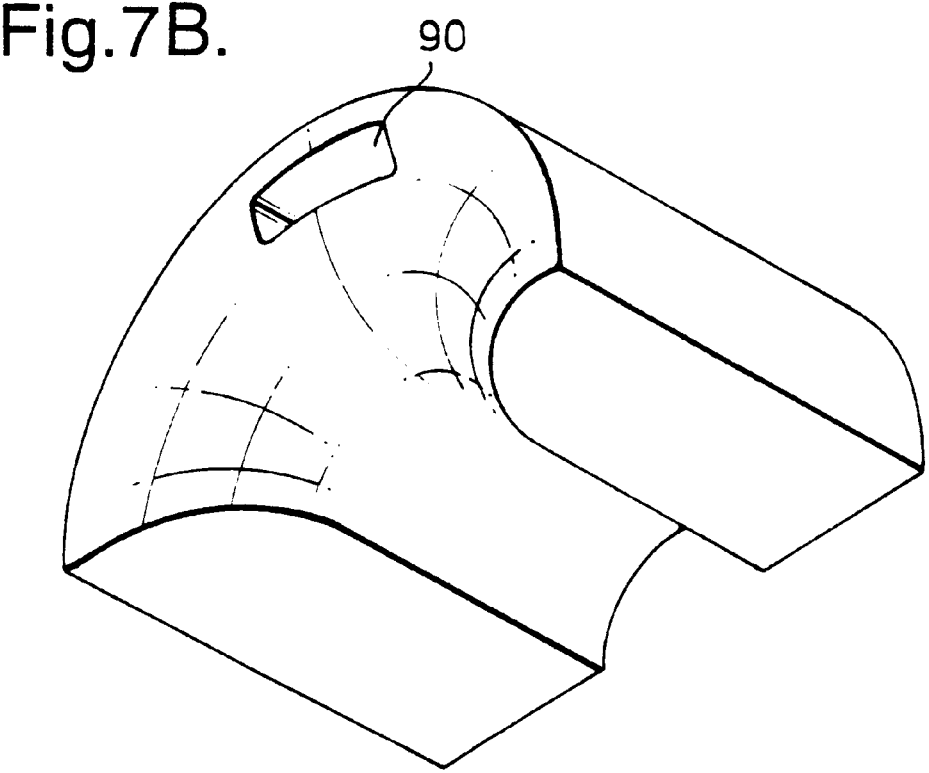
FIG. 7B shows a reverse angle isometric view of the stress cone of FIG. 7.

The still further modified stress cone 34E of FIGS. 7, 7A and 7B is provided with a modified diaphragm feature described above with respect to FIGS. 5 and 5A, together with certain range-taking features. Thus, the cone 34E has an aperture 90 (FIGS. 7A and 7B) at its front, gel-facing conical surface, as can be seen particularly in FIG. 7A showing a section through the cone. Gel 46 (not shown) enters through the aperture 90 and may exert a force on the outer surface of the stress cone, acting as a diaphragm 92 to extend into a displacement cavity formed in the housing (not shown) in a manner analogous to that described with reference to FIGS. 5 and 5A, but with the cavity formed in that part of the housing enclosing the body of the cone 34E. Alternatively, or additionally, the rear surface 94 of the aperture 90 can act as a diaphragm in a manner analogous to that described with reference to FIGS. 4 and 4A.

The stress cone 34E has in addition. range -taking features that allow it to be used with cables of various diameters, within a given range. Thus, the stress cone 34E has three apertures 96, 98, 100 therein, vented to its rear surface (FIGS. 7 and 7A), defining two channels 102, 104 therebetween that extend transversely into the cone and longitudinally partly thereinto from the rear surface. The operation of the range-taking ability of the case 34E, and its co-operation with the outer housing, are described hereafter with reference to FIGS. 9 and 10.

The embodiments discussed above allow for extension of the volume of the gel 46 in the joint as it increases its temperature, either due to increase in the temperature of the enclosed cable in operation, and/or due to increasing ambient temperature around the outer housing 40. However, since in the usual condition of the joint, that is to say, for the greater part of its lifetime, the gel 46 will be hot and thus expanded, it is also envisaged that accommodation may instead be made for contraction under certain conditions, such as for example when the power through the cables is interrupted. The gel-displacemert arrangement, in so far as it relies upon movement of a resilient member, may then be arranged so as to be in its relaxed condition whilst the gel is extended, and be arranged to stretch upon cooling and reduction in volume of the gel, thereby to maintain pressure on the gel. FIG. 8 shows an embodiment of such an arrangement, in which the stress-relief cone 34F has an aperture 110 locally at its outer circumference adjacent the housing wall 60F. The housing 60F has a cut-out portion 112 adjacent the aperture 110 but is separated therefrom by a flexible membrane 114 secured thereacross. The cut-out 112 is vented to the rear of the stress cone 34F. The membrane 114 and its securement to the housing 60F is arranged such that under normal operating conditions of the joint, the expanded gel 46 fills the aperture 110 and the diaphragm 114 is in its relaxed state. Upon cooling, and thus contraction of the gel 46, the diaphragm 114 is urged by excess air pressure from the venting chamber (not shown) to stretch, to extend into the aperture 110, and to adopt the position shown in dotted outline, and thus to maintain pressure on the gel 46.

It will be appreciated that the concept described with reference to FIG. 8 could be applied to other arrangements. for example that described with reference to FIGS. 5 and 5A.

FIGS. 9 and 10 show embodiments of a range-taking arrangement for providing a seal on to one of number elongate substrates of various diameters, exemplified by being applied to a stress-relief cone for use, for example, in the joint of FIG. 1. A housing 160 is of a relatively rigid, conductive polymeric, polypropylene, material, and is in the form of two generally-cylindrical half-shells (only one of which is shown). At each end, the housing 160 is provided with two substantially parallel and inwardly-directed planar projections or fins 162 for engaging with respective stress relief cones 164, each of which is also formed as two half cones. The stress cones 164 are formed from a relatively flexible conductive rubber material and have slots 166 therein for receiving respective ones of the projections 162. As can be seen from FIG. 10, when two such arrangements as described with reference to FIG. 9 are brought together around a cable 168, the softer material of the, now fully-formed stress cone 164 will tend to stretch over the outer diameter of the cable 168 and will tend to separate along the join surface 170 of the two halves of the joint enclosure. However, the rigidity of the projecting fins 162 extending into the stress cone 164 on each side of the cable 168 restrain movement of the cone 164 away from the cable 168 at the interface 170.

In the example shown in FIGS. 9 and 10, the stress cone 164 is provided with apertures 172 in its flexible material, opening towards the rear of the conical surface, that is to say at its surface away from the crimp region of the joint, on each side of the slots 166, which are re-inforced in the assembled configuration by the fins 162. The apertures 172 enhance the ability of the inner surface of the stress cone 164 to stretch over a cable 168 so as to accommodate cables of larger size whilst maintaining a good seal therearound at the interface 170. The central aperture 172 in particular defines an inner, semi cylindrical membrane that can be stretched around the cable 168, with the rigid reinforcing projections 162 urging the two halves of the cone 164 into conformity with the enclosed cable 168 at the interface 170.

It will be appreciated that the reinforcing interengagement arrangement of FIGS. 9 and 10 allows conformity with elongate substrates other than by means of using a stress-relief cone. The concept can be used for example to provide a seal around a shaft, or as a bushing where a cable, which may be of one of a number of diameters, passes through a bulkhead.

Referring to FIGS. 11 and 12, a half cone 800, manufactured from a conductive rubber material, is a modification of the half cone 164 of FIGS. 9 and 10. It will be appreciated that, like the half cone 164, the half cone 800 has a closed front end, and that one half cone will be located at each end of each half shell that forms the closure around the cable joint (only part of one half-shell being shown in FIGS. 11 and 12). At the rear (as shown) of the half cone 800, a large aperture 802 extends to the closed front surface of the cone, and is radially closed by the half shell 804. The aperture 802 is divided into three portions by a pair of fins 806 that extend generally radially from the inner surface of the half-shell 804, in a manner similar to the way in which the fins 162 extend from the housing half shell 160 as shown in the embodiment of FIG. 9. The fins 806 are disposed so as, in operation, to lie one on each side of the cable within the joint. A relatively thin wall portion 808 at the inner side of the half cone 800 is arched so as, in operation, to conform around an enclosed cable and so as to receive and guide the free, inner ends of the fins 806. As shown in FIG. 11, the fins are positioned relatively close to the longitudinal axis of the joint, and the length of the arched portion of the inner wall 808 of the half cone 800 is minimised. In this position of the fins 806, the half cone 800 will conform to a minimum diameter size cable (not shown). As can be seen from FIG. 12, the fins 806 have a flexibility that allows them to splay outwards and to allow a greater length of the arched wall portion 808 to extend therebetween. In this position, the half cone 800 will conform to a maximum diameter size cable. It is to be noted that in this embodiment, unlike that of FIG. 9 and 10, the inner half cone surface 808 is not stretched. The presence of the fins 806, however, still ensures substantially complete conformity of the completed cone around a range of sizes of cable, without air pockets being present at the interface of the two half cones adjacent the cable surface. It will be appreciated that the flexibility of the fins 806 is such that they are able to splay outwards around a larger diameter cable but that they are relatively rigid with respect to the softer elastomeric material of the half cones 800.

Figure 13A:
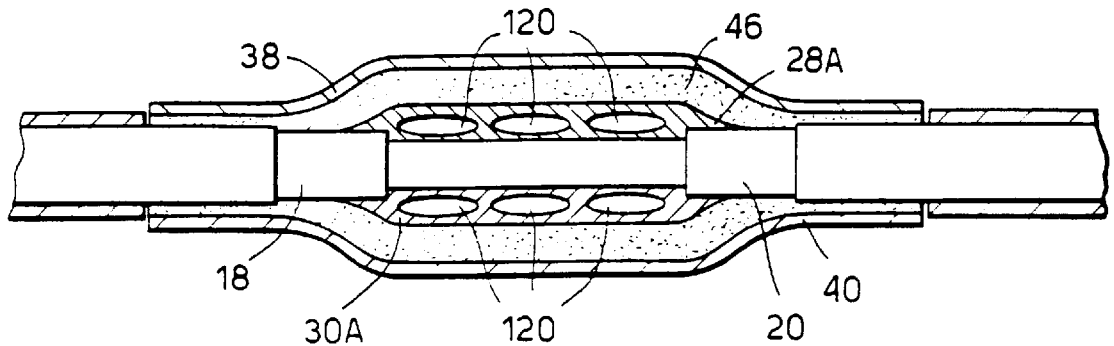
FIGS. 13A, 13B and 13C illustrate schematically features applicable to the Faraday Cage of the joint of FIG. 1 for accommodating expansion of the sealant material of the joint.
Figure 13B:
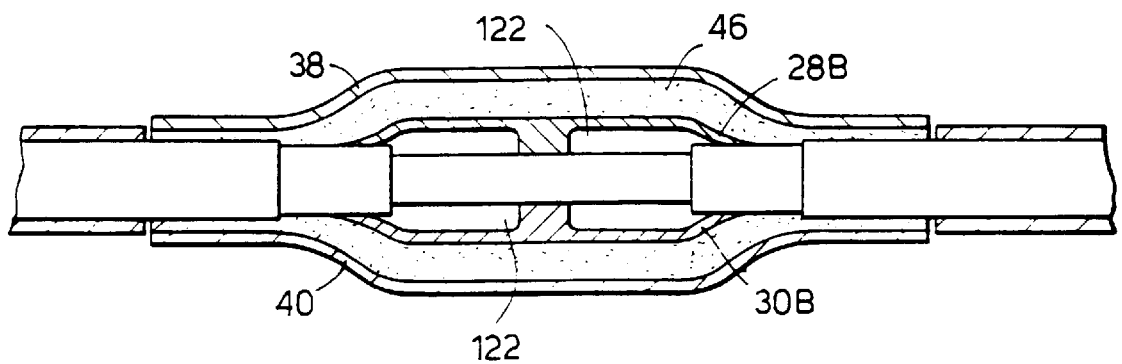
Figure 13C:
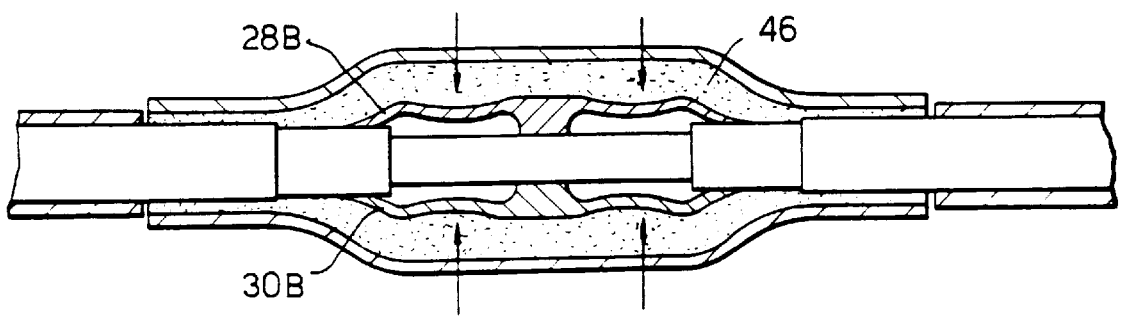

An alternative, or additional, way of providing for expansion of the gel 46 in the joint of FIG. 1, is shown with reference to FIG. 13A and also with reference to FIGS. 13B and 13C, each of which shows a Faraday Cage modified from that illustrated at 28, 30 in FIG. 1. Referring to FIG. 13A, the two half-shells 28A, 30A are formed from flexible conductive polymeric material, and contain three apertures 120, therein. As the gel 46 expands, the increased pressure is exerted on the half shells 28A, 30A, which deform by compression of the apertures 120. Cooling of the gel leads to expansion of the volume of the apertures 120 and thus to the maintenance of pressure on the gel 46.

A modification of the arrangement of FIG. 13A is shown in FIGS. 13B and 13C, in which each end of the half-shells 28B and 30B is sealed on to the cable dielectrics 18, 20 so as to define two apertures 122 located within the Faraday Cage 28B, 30B around the crimped conductors. As shown in FIG. 13C, the apertures 122 accommodate an increase of gel pressure by inward flexing of the half-shells 28B, 30B upon expansion of the gel 46.

Figure 14:
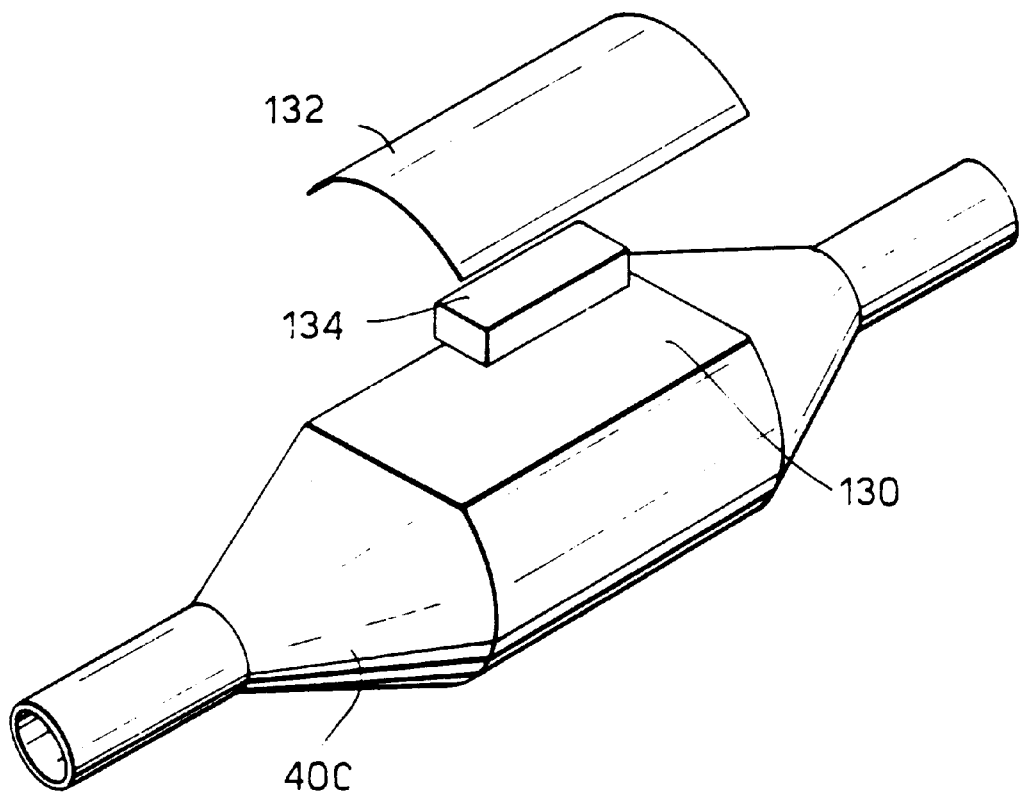
FIG. 14 shows schematically one modification of the housing of the joint of FIG. 1 for accommodating expansion of the sealant material.
Figure 15:
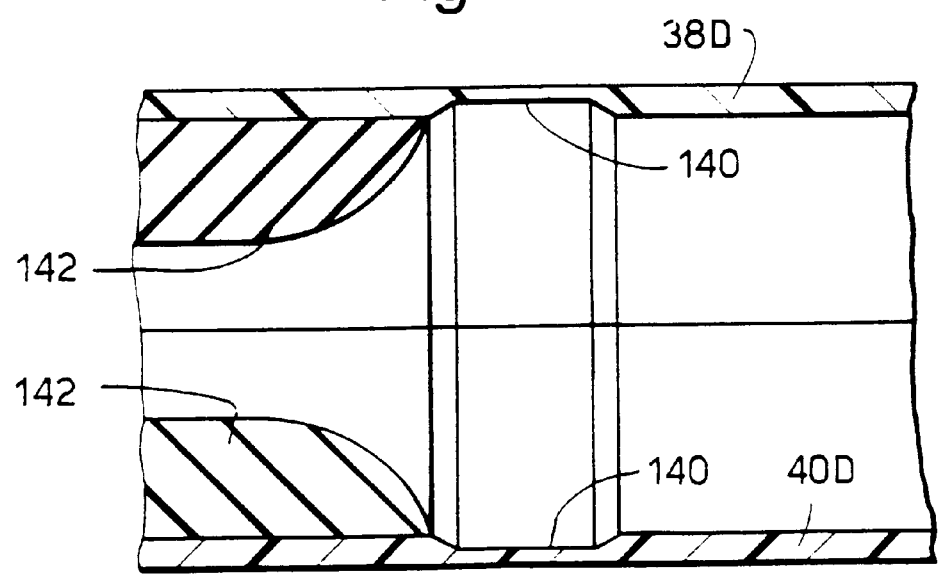
FIG. 15 shows a further modification of the housing of FIG. 1.

FIGS. 14 and 15 disclose two embodiments of the joint concept of FIG. 1 in which change of volume of the sealant material 46 is accommodated by a modification of the configuration of the outer housing 40.

In the embodiment of FIG. 14, the generally rigid outer housing 40C is provided as part of its surface with flexible wall 130 that is subject to the pressure of the gel 46 (not shown) contained therein. To complete the rigidity of the housing 40C overall which may, in operation, be buried in the ground, a rigid cover 132 is arranged to fit over the flexible wall 130 to define a cavity therewith. A resilient block 134 of rubber is located within the cavity. Thus, on expansion of the gel 46, the flexible wall 130 will transmit the pressure into compression of the block 134 against the restraint of the rigid housing 40C, and on contraction, the wall 130 will maintain pressure on the gel so as to prevent formation of voids around the joint.

The embodiment of FIG. 15 is arranged to achieve the same effect as that of FIG. 14, but to this end each half of the housing 40D is made of a rubber material and has a circumferential portion 140 of thinner section adjacent the stress cone 142 so as preferentially to expand, accommodate any increase in gel volume, and to exert a restoring force thereon.

Referring to FIGS. 16, 17 and 18 an elongate semi-cylindrical integral rubber moulding 1000 has a relatively thin wall intermediate section 1002 (FIG. 17) and a pair of relatively thick wall end sections 1004 that have a half-stress cone 1006 formed on the inside thereof (FIG. 18). The moulding 1000 is arranged to be fitted into a rigid plastic outer case 1008 that is radially spaced therefrom along at least part of the intermediate section 1002. Displacement or expansion of the gel filling material within the moulding 1000 results in flexing of the intermediate section 1002 into the expansion chamber provided by the outer case, preferably formed from a pair of half-shells, of the completed joint.

The rigid internal support members 150,160 discussed hereinafter with respect to FIGS. 21, 22 and 22A, may be integrated into the rubber moulding 1000 and located by snap-fitting into the outer plastic case.

Figure 19:
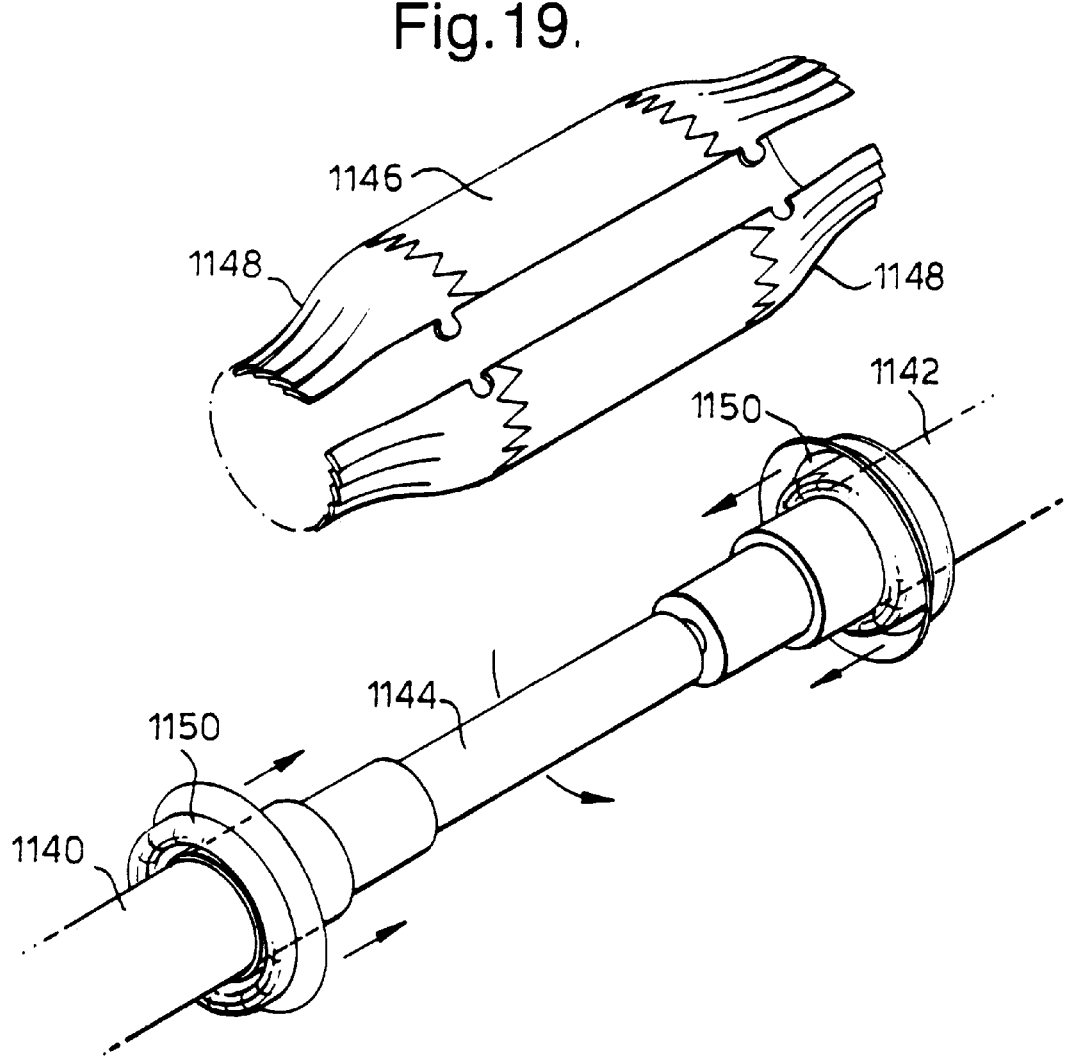
FIGS. 19 and 20 schematically show a modification of the outer housing of the joint, formed from three components.
Figure 20:
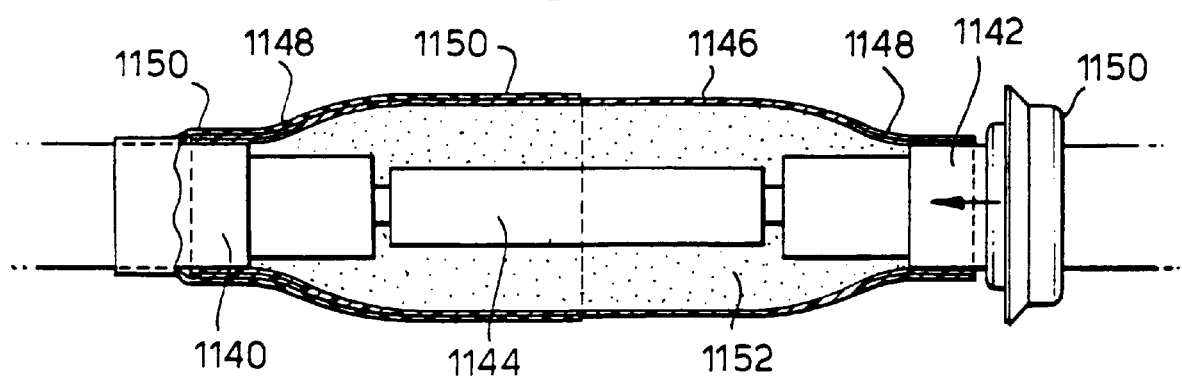

Referring to FIGS. 19 and 20, two cables 1140 and 1142 are shown schemically jointed at 1144. A wraparound elastomeric insulating body 1146 has fingers 1148 at each end thereof than can be tapered down to conform with the reduced diameter of the cables 1140, 1142 on each side of the joint region 1144. One cylindrical closure member 1150 is initially rolled on to each of the cables 1140, 1142. The closure members 1150 are formed from conductive rubber.

FIG. 20 shows the joint partially completed. The insulating body 1146, which may comprise a mating pair of half-shells rather than being of the wraparound configuration as shown, encloses insulating gel material 1152 and may also contain solid insulation enclosing the gel sealant. The body 1146 is closed around the joint 1144 and the fingers 1148 brought down on the cables 1140, 1142. One conductive closure member 1150 is shown as having been uncurled from its parked position on the cable 1140, so as to extend to just more than halfway across the body 1146. The other, still-parked closure member 1150 on cable 1142 will then be uncurled so as to overlap the first closure member. In this way, the insulating body 1146 including both its fingered end-sections 1148, and the entire cable joint region is enclosed within the two conductive outer members 1150.

Figure 21:
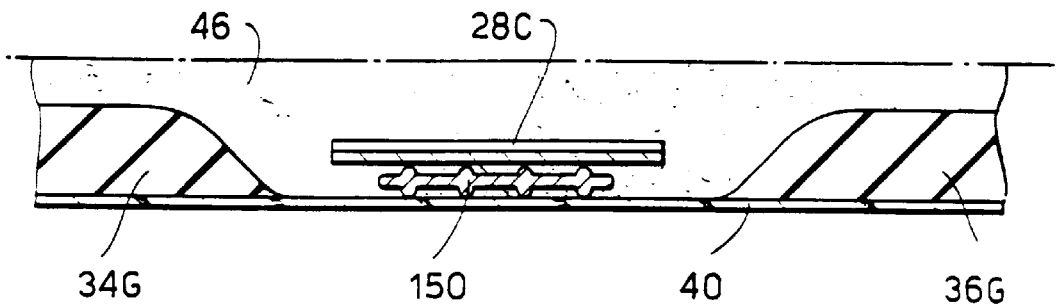
FIG. 21 shows schematically one arrangement in which a Faraday Cage of a cable joint may be supported when it is enclosed by non-rigid material.
Figure 22:
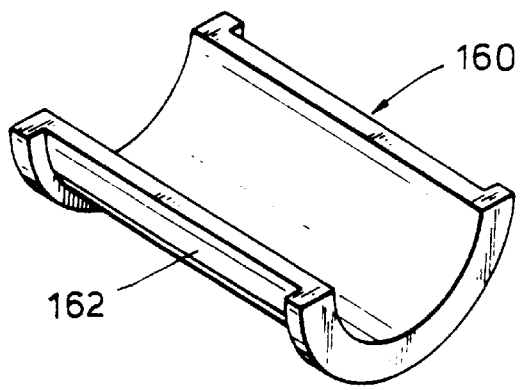
FIG. 22 shows another embodiment of support for a Faraday Cage.
Figure 22A:
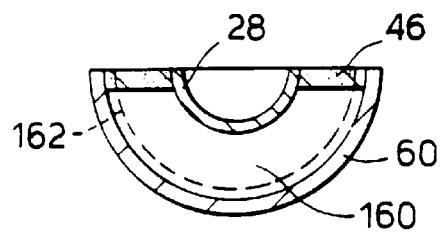
FIG. 22A shows a cross section through part of a joint employing the support member of FIG. 22.

FIGS. 21, 22 and 22A disclose embodiments of cable joint in which a conductive component such as a Faraday Cage, can be supported within the joint when it is otherwise enclosed by non-rigid material, and in particular can be positively located with respect to an outer conductive housing.

In FIG. 21, the arcuate Faraday Cage 28c is made of conductive polymeric material, is disposed in silicone gel sealant 46 as hereinbefore described, is radially spaced (by means not shown) from the enclosed crimped conductors (not shown), and is located axially between stress cones 34G and 36G. These components are enclosed within the outer housing 40 of conductively—filled polypropylene. Under certain conditions, and especially when the temperature of the gel 46 is increased, there is a likelihood that the conductive cage 28c could move laterally within the gel 46 towards the housing 40, which is at earth potential, and thus form a short circuit from the high voltage of the cable conductors. In this embodiment, movement of the cage 28C is prevented by employing an insulating polymeric support cradle or spacer 150. The cradle 150 is arcuate and mounted in the annular gap between the cage 28C and the housing 40, and, like those components, is formed as two half-shells. Each half of the spacer 150 is provided with a series of projections on each of its curved surfaces so as to distance it from both the cage 28C and the housing 40, thereby to allow gel 46 substantially completely to fill the space therearound. The spacer 150 is arranged to provide good physical interengagement with both the cage 28C and the housing 40, for example by means of interlocking projections and apertures and/or a snap-fitting mechanism, thereby securely to maintain the conductive cage 28c in position both radially and longitudinally within the joint.

FIGS. 22 and 22A show another variation of support member for use with a Faraday Cage. Referring to these Figures, the polymeric insulating support member 160 is of partial semi-cylindrical configuration, being flanged at each end so as to provide for an annular channel 162 between the support 160 and the outer housing 60 when used in operation to support the Faraday Cage 28. As shown in FIG. 22A, which is a section through one of the half-shell components of the joint, the Faraday Cage 28 and housing 60 are fully semicylindrical so that when brought together with the corresponding half-shell around the crimped conductors (not shown), the cylindrical surfaces thereof are completed. The two half shells of the support member (only the one 160, being shown) however extend for less than 180 degrees, with the region therebetween, as well as the channel 162, being filled by the gel 46, to provide a gel/gel radial interface between the Faraday Cage 28 and the housing 60 on closure of the two half shells around the crimp region. The support member 160 may be mechanically interlocked, as described with reference to the embodiment of FIG. 21 for example, with both the Faraday Cage 28 and the housing 40 of its respective half shell so as securely to locate the Faraday Cage 28 within the joint.

The support spacers 150, 160 may but need not extend longitudinally co-terminously with the associated Faraday Cage.

In a further modification, it is envisaged that the support member may be moulded integrally with the Faraday Cage and/or the housing. In such a construction, the moulding operation itself may exclude air from the moulded surface of the support member, thus avoiding the need to allow the gel 46 to have access to any interface between the support member and the Faraday Cage and/or housing.

Figure 23:
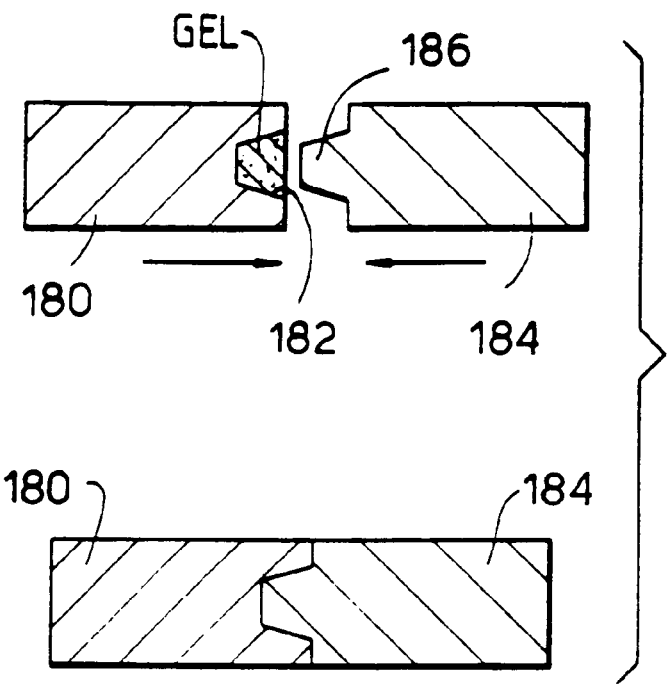
FIGS. 23 and 23A show embodiments in section of a seal along the longitudinal edges of the two half shells of the housing of the joint.
Figure 23A:
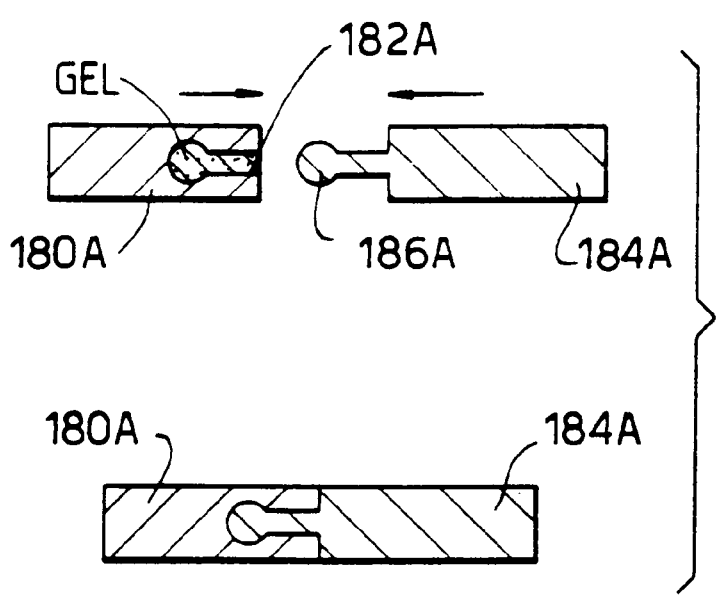

FIGS. 23 and 23A show two different configurations by which the longitudinal edges of the two half shells of the housing of a cable joint can be interlocked. In each case, one edge 180,180A is provided with a groove 182,182A extending therealong, being of trapezoidal section in FIG. 23 and of key-hole section in FIG. 23A. The grooves 182,182A are filled with gel, advantageously the same as that providing the bulk insulation of the joint. The opposing edges 184, 184A of the housing are provided with correspondingly-shaped projections 186,186A. Upon closure of the two half shells of the housing around the electrical connection, the projection 186,186A engages the associated groove 182, 182A, and the gel forms a seal therebetween.

Figure 23B:
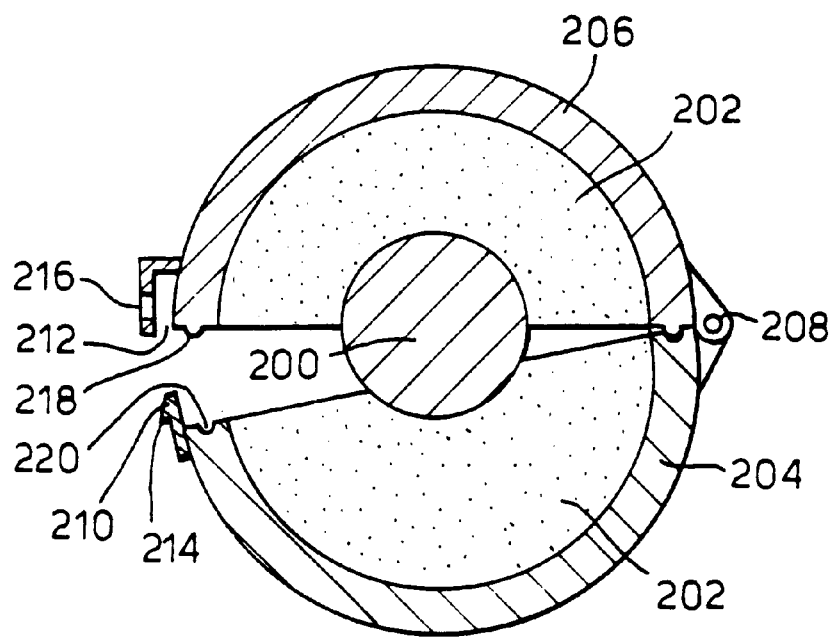
FIG. 23B shows a cross-section through a modified joint showing a longitudinal closure mechanism.

Referring to FIG. 23B, a cross-section is shown of a jointed cable schematically at 200 partially embedded in gel 202 that is contained in each part of a pair of half-shells 204, 206. The half-shells 204, 206 are substantially semi-cylindrical and are hinged together at 208 along one pair of longitudinal edges. The hinged cylindrical housing formed by the two half-shells is closed around the jointed cables and FIG. 23B represents the situation just prior to closure of the housing. The longitudinal edges of the half-shells 204, 206 opposite the hinge 208 are provided with a co-operating tongue 210 and groove 212 arrangement along the major part of the length of the housing which contains the gel 202 that is to be urged into conformity around the enclosed jointed cables. The tongue 210 is of such a length, in the circumferential direction, that on closure of the two half-shell 204, 206, it engages the groove 212 before pressure on the gel 202 is sufficient to exude it sideways out of the housing. In this way, all the gel 202 is completely contained within the closed housing circumferentially, thus avoiding any possible shearing of the gel that could subsequently lead to the creation of voids within the housing.

Positive locking together of the two half-shells 204, 206, is achieved by a plurality of discrete projections 214 along the outer surface of the tongue 210 which snap into co-operating apertures 216 in the outer wall of the groove 212.

Sealing of the housing against ingress of moisture, air, dust or other contaminants around its periphery at the interface of the two half-shells 204, 206 is enhanced by the provision of a ridge 218 around the entire periphery of the half-shell 206 that tightly engages with a mating peripheral depression 220 in the half-shell 204.

Finally, the two half-shells may be secured together by toggle clips or other suitable fastening means applied externally of the closed housing.

Figure 24:
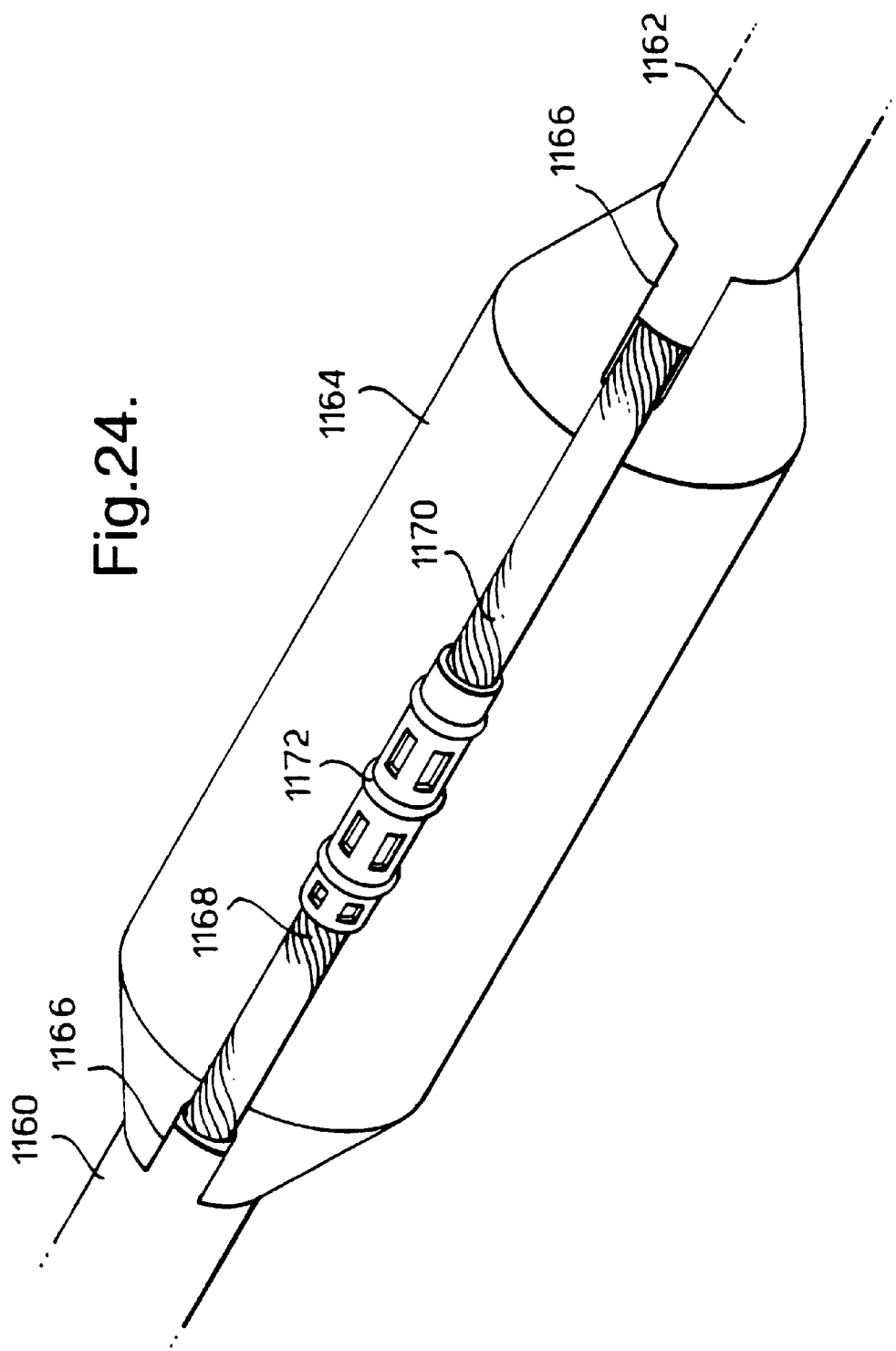
FIG. 24 is an isometric view of one embodiment of a completed joint.

Referring to FIG. 24, a joint between two screened cables 1160,1162 is enclosed within a two-part housing 1164. A slot 1166 is cut axially into the housing 1164 at each end thereof in longitudinal alignment, and the screen wires 1168,1170 of the cables 1160,1162 respectively are brought out through the slots 1166 and crimped together at 1172 over the outer housing surface. The connecting together of the screen wires 1168,1170 and their engagement within the slots 1166 in this manner, prevents the housing 1164 from moving either rotationally or longitudinally with respect to the jointed cables.

Figure 25:
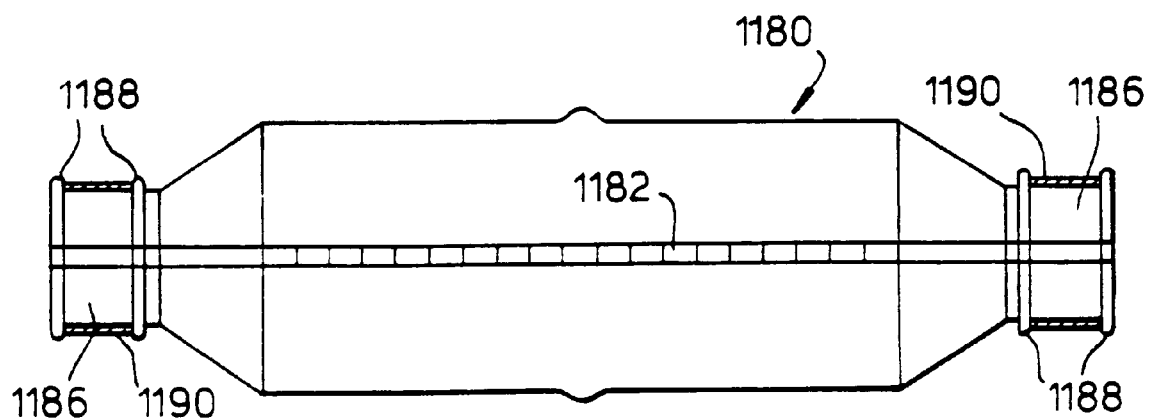
FIG. 25 is a side view of a further embodiment of housing.

Referring to FIG. 25, the housing 1180 is formed from two semi-cylindrical halfshells that are hinged together at 1182 along its central portion, and that are sealed by a tongue and groove arrangement around their mating peripheries. Beyond a tapered portion towards each end of the housing 1180, a cylindrical portion 1186 is formed between a pair of ribs 1188 that extend around the circumference of the housing. The housing 1180 is secured on to the enclosed jointed cables by means of tape, a tie-wrap, a roll-spring or the like 1190 that is wrapped around the cylindrical housing portions 1186. To enhance the sealing, and to assist the retention, of the housing on the cables, mastic or other sealant material may be located between the housing portions 1186 and the underlying cable jackets. The sealant material may be applied to the cables as a wrapping, or may be retained by the housing 1180.

We claim:

1. An enclosure arranged to enclose a connection between a screened electric power cable and another piece of electrical equipment, the enclosure comprising a housing, at least one electrical stress cone contained within the housing, and a quantity of compressible sealant material that is contained by the housing and that substantially fills the housing when enclosing the connection, wherein the at least one stress cone comprises resilient aperture means that is arranged to change its volume in response to a change of volume, or displacement, of the sealant material thereby, in operation, to maintain substantially complete filling of the housing around the connection without the formation of voids therein.

2. An enclosure arranged to enclose a connection between a screened electric power cable and another piece of electrical equipment, the enclosure comprising a housing, at least one electrical stress cone contained within the housing, and a quantity of oil-extended polymeric sealant material that is contained by the housing and that substantially fills the housing when enclosing the connection, wherein the at least one stress cone comprises resilient aperture means that is arranged to change its volume in response to a change of volume or displacement of the sealant material thereby, in operation, to maintain substantially complete filling of the housing around the connection without the formation of voids therein.

3. An enclosure according to claim 1 or claim 2, wherein the resilient aperture means is arranged (a) on expansion or displacement of the sealant material to be compressed or to be reduced in volume so as to accommodate an increased sealant volume, and (b) on contraction of the sealant material to exert pressure thereon so as to prevent the formation of voids therein.

4. An enclosure in accordance with claim 1 or claim 2, wherein, in operation, the resilient aperture means is in a relaxed condition when the sealant material is in an expanded or displaced state, and is stretched when the sealant material is in a contracted state.

5. An enclosure according to claim 1 or claim 2, wherein the resilient aperture means of the at least one stress cone is provided by a void or gaseous entrapment contained completely within a resilient portion of the at least one stress cone.

6. An enclosure according to claim 1 or claim 2, wherein the resilient aperture means of the at least one stress cone is provided by a void or gaseous entrapment located between a resilient portion of the stress cone and a non-resilient portion of the housing.

7. An enclosure according to claim 1 or claim 2, wherein the resilient aperture means of the at least one stress cone comprises an aperture containing a resilient arrangement that is subject to the pressure of the sealant material.

8. An enclosure according to claim 7, wherein the resilient arrangement comprises a spring and a plunger retained within the aperture, the plunger closing the aperture to entry of the sealant material and in contact therewith.

9. An enclosure according to claim 1 or claim 2, wherein the resilient aperture means comprises an aperture that contains or can receive some of the sealant material, the aperture having a resilient wall for urging the sealant material into the region of the connection.

10. An enclosure according to claim 1 or claim 2, wherein the sealant material comprises gel.

11. An enclosure according to claim 1 or claim 2, wherein the electrical equipment comprises a further screened electric power cable and the at least one stress cone comprises two stress cone, each associated with each cable within the housing.

12. An enclosure according to claim 1 or claim 2, comprising an electrically-conductive member that is arranged, in operation, to be disposed around the connection of the conductor of the cable to the equipment as to make a region there around substantially free of electric field.

13. An enclosure according to claim 12, wherein the electrically-conductive member is resilient, thereby, to exert a pressure on the sealant material.

14. An enclosure according to claim 1 or claim 2, wherein at least a portion of a wall of the housing subject to the pressure of the sealant material is resilient so as, in operation, to accommodate expansion of the sealant material.

15. An enclosure according to claim 12, comprising location means arranged to support the electrically-conductive member and to maintain its position within the sealant material.

16. An enclosure according to claim 15, wherein the housing has an electrically conductive outer surface for sealingly enclosing the sealant material, wherein the location means comprises electrically insulating material and is arranged to secure the electrically-conductive member to the housing.

17. An enclosure according to claim 1 or claim 2, wherein the at least one stress cone comprises (a) a relatively rigid component and (b) a relatively resilient component, wherein the rigid component, in operation, is arranged to urge the resilient component into substantially complete conformity around the cable.

18. An enclosure according to claim 1 or claim 2, wherein the housing is in two parts, each part of which contains a part of the at least one stress cone and part of the sealant material, such that, in operation, on closure of the two housing parts circumferentially around the connection, the two parts of the at least one stress cone mate around the cable and the sealant material forms an interfacial seal between the two parts of the housing and with the connection.

19. An electrical interconnection between a screened electric power cable and electrical equipment, wherein the cable is cut back such that conductor, primary dielectric and screen thereof are exposed, wherein an enclosure in accordance with claim 1 or claim 2 is disposed around the interconnection with said at least one stress cone being located at the end of the cable screen.

* * * * *